(12) United States Patent
Vallart

(10) Patent No.: US 9,926,075 B2
(45) Date of Patent: Mar. 27, 2018

(54) METHOD OF CONTROLLING A MAIN ROTOR OF A ROTORCRAFT, AN ASSOCIATED CONTROL SYSTEM, AND A ROTORCRAFT FITTED WITH SUCH A CONTROL SYSTEM

(71) Applicant: AIRBUS HELICOPTERS, Marignane (FR)

(72) Inventor: Jean-Baptiste Vallart, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 15/356,733

(22) Filed: Nov. 21, 2016

(65) Prior Publication Data
US 2017/0144752 A1    May 25, 2017

(30) Foreign Application Priority Data
Nov. 24, 2015 (FR) ..................................... 15 02453

(51) Int. Cl.
*B64C 13/22* (2006.01)
*B64C 27/57* (2006.01)
(Continued)

(52) U.S. Cl.
CPC .............. *B64C 27/14* (2013.01); *B64C 13/04* (2013.01); *B64C 27/52* (2013.01); *B64D 25/00* (2013.01); *B64C 27/57* (2013.01)

(58) Field of Classification Search
CPC ......... B64C 27/14; B64C 27/52; B64C 27/57; B64C 13/04; B64D 25/00
See application file for complete search history.

(56) References Cited

U.S. PATENT DOCUMENTS 6,390,412 B1    5/2002  Stevens
6,735,500 B2    5/2004  Nicholas et al.
(Continued)

FOREIGN PATENT DOCUMENTS

FR          2766158          1/1999

OTHER PUBLICATIONS

French Search Report for French Application No. FR 1502453, Completed by the French Patent Office, dated Sep. 1, 2016, 8 Pages.

*Primary Examiner* — Michael J Zanelli
(74) *Attorney, Agent, or Firm* — Brooks Kushman P.C.

(57) ABSTRACT

A control method and system for controlling a main rotor of a rotorcraft to perform a stage of flight in auto-rotation. The control system has a control member for controlling the collective pitch of the blades of the main rotor. The control member is movable over an amplitude of positions between two extreme physical stops. A calculation unit calculates a collective pitch angle for the blades of the main rotor, referred to as an "auto-rotation collective pitch". This enables the main rotor to rotate at a speed of rotation that is optimum for the stage of flight in auto-rotation of the rotorcraft. A motor means controls the position of the control member at a predetermined position, referred to as the "auto-rotation position", in which the control member generates a control setpoint for servo-controlling the current collective pitch of the blades of the main rotor on the "auto-rotation collective pitch".

13 Claims, 1 Drawing Sheet

(51) Int. Cl.
*B64C 27/14* (2006.01)
*B64C 13/04* (2006.01)
*B64C 27/52* (2006.01)
*B64D 25/00* (2006.01)

(56) References Cited

U.S. PATENT DOCUMENTS

| | | | |
|---|---|---|---|
| 8,295,997 B2* | 10/2012 | De Bono | G01C 23/005 |
| | | | 340/946 |
| 8,651,425 B2* | 2/2014 | Mercer | B64C 27/57 |
| | | | 244/17.13 |
| 2004/0010354 A1 | 1/2004 | Nicholas et al. | |
| 2005/0135930 A1* | 6/2005 | Certain | B64C 27/57 |
| | | | 416/30 |
| 2007/0164167 A1 | 7/2007 | Bachelder et al. | |
| 2013/0221153 A1 | 8/2013 | Worsham, II et al. | |

* cited by examiner

METHOD OF CONTROLLING A MAIN ROTOR OF A ROTORCRAFT, AN ASSOCIATED CONTROL SYSTEM, AND A ROTORCRAFT FITTED WITH SUCH A CONTROL SYSTEM

CROSS REFERENCE TO RELATED APPLICATION

This application claims priority to French patent application No. FR 15 02453 filed on Nov. 24, 2015, the disclosure of which is incorporated in its entirety by reference herein.

BACKGROUND OF THE INVENTION (1) Field of the Invention

The present invention relates to the field of piloting rotary wing aircraft such as rotorcraft during stages of flight at low power.

This may apply in particular in the event of a failure of a power plant that was initially driving rotation of a main rotor of a rotorcraft for the purpose of providing it with lift. This also happens during a stage of flight in auto-rotation in which the kinetic energy of the rotorcraft descending serves to drive its main rotor in rotation, thereby giving rise to a lift force.

Thus, the invention relates more particularly to a method of controlling a rotorcraft main rotor, which method is adapted to enable such a rotorcraft to perform a stage of flight in auto-rotation. The invention also provides a control system for a rotorcraft main rotor, and a rotorcraft fitted with such a control system.

(2) Description of Related Art

Usually, the failure of a power plant and a stage of flight in auto-rotation are two situations that occur together. Specifically, it is generally as a result of a failure of at least one engine that a pilot of the rotorcraft changes over as an emergency to a stage of flight in auto-rotation in order to enable the rotorcraft to land as soon as possible.

Nevertheless, it is necessary for all pilots to be trained in performing such difficult emergency maneuvers. A stage of flight in auto-rotation can thus also be performed voluntarily by the pilot with engines that are operational but delivering little or no power to the main rotor.

In order to trigger such a stage of flight in auto-rotation, the pilot of the rotorcraft generally actuates a control member such as a collective pitch stick serving to modify the pitch of the blades of the main rotor of the rotorcraft collectively. By way of example, the stage of flight in auto-rotation may then be triggered voluntarily by a pilot placing the control member in such a manner as to desynchronize rotation of the main rotor and rotation of the engines. The pilot continues to move the control member manually until reaching a level of collective pitch that makes it possible to perform a stage of flight in auto-rotation, which level is referred to below as the "auto-rotation collective pitch". Furthermore, this "auto-rotation collective pitch" is a function of the size and of the number of blades making up the rotor.

Thus, such a required "auto-rotation collective pitch" may be determined by calculation at the time the main rotor is designed. The "auto-rotation collective pitch" then corresponds to the collective pitch angle of the blades that enables the main rotor to store kinetic energy in rotation so as to guarantee that the flight path for the rotorcraft can be flattened out for landing on the ground without impact. Such stored kinetic energy is then transformed into potential energy to enable the rotorcraft to be landed without danger by reducing its vertical speed on landing, possibly even to zero.

In addition, during such an auto-rotation maneuver, the current pitch level is displayed on an on-board instrument referred to as a "first limit indicator" (FLI). The FLI also serves to indicate both a "desynchronization" pitch between the rotor and the power plant, and also a maximum/minimum pitch that is acceptable for the power plant driving the blades of the rotor in rotation.

Nevertheless, under such circumstances, the visual display on the FLI does not make it possible to avoid unwanted desynchronization as a result of the pilot making an inappropriate maneuver on the control member, such as a collective pitch stick. Nor does the display on the FLI help in balancing the speed of auto-rotation, and in particular help avoid unwanted resynchronization between the rotor and the power plant. Specifically, the change over from the synchronized state to the desynchronized state needs to be stable in order to reduce the workload on the pilot. Finally, it is not possible to guarantee that the power delivered by the power plant will not exceed limits.

A pilot does indeed regularly monitor the rotorcraft's instruments, but the pilot also needs to observe the outside of the rotorcraft, very particularly during difficult maneuvers, such as stages of flight in auto-rotation and/or landing approaches after a steep flight path. By looking outside, the pilot might miss seeing limit violations on the scale of the FLI.

Furthermore, it is also known to provide a rotorcraft with a system for identifying an engine failure and then automatically triggering a stage of flight in auto-rotation. Such a control method and system are thus described in Documents US 2013/0221153 and US 2007/164167.

Nevertheless, such a control system is limited to an automatic safety system and does not appear to apply to the situation in which a pilot of the rotorcraft seeks voluntarily to trigger a stage of flight of the rotorcraft in auto-rotation.

Furthermore, all of those devices seek to provide protection so as to avoid power plant power limits being violated at high levels of collective pitch, e.g. corresponding to a collective pitch angle lying in the range 7° to 10°. Nor do they guarantee safety for a stage of flight in auto-rotation at low power levels, e.g. corresponding to a collective pitch angle lying in the range 0° to 3°.

Document FR 2 766 158 describes a method and a system for controlling a rotorcraft that provide a pilot with assistance in avoiding reaching a maximum engine speed. Such a method thus generates a motor-driven stop forming a hard point opposing freely continued pivoting movement of the collective pitch lever in a downward direction when the setpoint maximum rotor speed is reached or exceeded. Such a motor-driven stop is also servo-controlled in position and it can be exceeded.

Nevertheless, in Document FR 2 766 158, once the motor-driven stop has been exceeded, it does not facilitate piloting the rotorcraft in auto-rotation by servo-controlling the position of the collective pitch lever on a predetermined position referred to as the "auto-rotation position". The collective pitch lever therefore does not act automatically to generate a control setpoint for servo-controlling the current collective pitch of the blades of the main rotor on an auto-rotation collective pitch.

Furthermore, Document FR 2 766 158 does not disclose that the motor-driven stop coincides with a "desynchronization position" in which the collective pitch lever generates a control setpoint for servo-controlling a current collective pitch of the blades of the main rotor on a "desynchronization collective pitch" enabling the rotary motion of the main rotor and of a power plant of the rotorcraft to be desynchronized.

Document US 2004/010354 also describes a method enabling a pilot to be assisted by means of a tactile sense signal transmitted by motor-driven means to a mini-stick for controlling the collective pitch.

Nevertheless, as in Document FR 2 766 158, such a Document US 2004/010354 does not describe servo-controlling the position of the mini-stick on the auto-rotation position, nor does it describe the exceedable stop coinciding with a desynchronization position.

Consequently, such a method is not optimum for assisting the piloting of a rotorcraft during a stage of flight in auto-rotation.

BRIEF SUMMARY OF THE INVENTION

An object of the present invention is thus to propose a control method, a control system, and an associated rotorcraft making it possible to overcome the above-mentioned limitations. The control system thus serves to communicate tactile information to the pilot of the rotorcraft when moving a control member for modifying the collective pitch angle of the main rotor of the rotorcraft.

Another object of the invention is to avoid involuntary desynchronization between the engine(s) and the rotor(s) of the rotorcraft or indeed an involuntary changeover between the synchronized state and the desynchronized state.

The invention thus provides a control method for controlling a main rotor of a rotorcraft to perform a stage of flight in auto-rotation of the rotorcraft, such a control method comprising:
  a calculation step for calculating a collective pitch angle for the blades of the main rotor, referred to as the "auto-rotation collective pitch", the "auto-rotation collective pitch" generating a speed of rotation of the main rotor that is optimized for the stage of flight in auto-rotation of the rotorcraft; and
  a drive step of applying motor drive to a control member for controlling the collective pitch of the blades of the main rotor, the control member being movable over an amplitude of positions lying between two extreme physical stops, such a drive step being performed by motor means and being used when a pilot of the rotorcraft manually moves the control member over the amplitude of positions of the control member and positions the control member beyond a first stop position of the control member, such a first stop position being generated by the motor means exerting a first predetermined force opposing a manual actuation force exerted by the pilot on the control member, the first predetermined force acting locally over the amplitude of positions of the control member when the control member is arranged at the first stop position, the manual actuation force exerted by the pilot on the control member being capable of exceeding such a first predetermined force.

According to the invention, such a control method is remarkable in that the motor means enable the position of the control member to be servo-controlled on a predetermined position referred to as the "auto-rotation position" in which the control member generates a control setpoint for servo-controlling the current collective pitch of the blades of the main rotor on the "auto-rotation collective pitch", and in that the first stop position of the control member coincides with a "desynchronization position" in which the control member generates a control setpoint for servo-controlling a current collective pitch of the blades of the main rotor on a "desynchronization collective pitch" for desynchronizing rotary motion between the main rotor and a power plant of the rotorcraft.

In other words, the pilot can voluntarily choose to initiate a stage of flight in auto-rotation of the rotorcraft by acting manually on the control member, such as a collective pitch stick. The pilot must then exert a manual force on the control member in order to make it possible to go past the first stop position on the amplitude of possible positions for the control member. By way of example, such a first stop position may correspond to a position in which the control member generates a control setpoint for causing the collective pitch of the main rotor to have a value in the range 2° to 3°, and preferably a value close to 2.5°.

The pilot may also seek not to enter into the stage of flight in auto-rotation by stopping the movement of the control member at the first stop position. This option is thus felt immediately by the pilot in the form of tactile information from the control member and there is no longer any need for the pilot to monitor visual information on the FLI.

Furthermore, such a control method may also be performed in the event of a failure of an engine, and thus in an emergency stage of flight in auto-rotation, as well as when training a pilot, which corresponds to a voluntary stage of flight in auto-rotation.

In addition, the drive step serves to servo-control the position of the control member so that the control setpoint that it generates corresponds to a speed of rotation of the main rotor that is required for a stage of flight in auto-rotation.

Furthermore, such motor means are said to be "active" since they make it possible in real time to modify the flight control laws concerning the movement of and/or the force applied to the control member of the rotorcraft. Such motor means thus include a control member for controlling an actuator such as a hydraulically, pneumatically, or electrically controlled jack, such as a compensator actuator or a trim actuator acting on a linkage of the control member in a so-called "conventional" rotorcraft, or acting directly on the control member when using electrical, magnetic, or optical flight controls. Under such circumstances, the control member is not dynamically or mechanically linked with a servo-control e.g. for moving a swashplate that controls the collective pitch of the main rotor.

In certain particular circumstances, the motor means may also be incorporated in the control member when using electrical, magnetic, or optical flight controls capable of small movements only, such as a mini-stick, which can also be referred to as a "joystick". The motor means are then received in a stationary support of the control member and they serve to generate a first predetermined force on the stick of the control member opposing a manual actuation force exerted by the pilot on the joystick.

The motor means thus serve both to generate the first stop position by exerting the first predetermined force, and also to anchor the control member in the auto-rotation position once the pilot has actuated the control member to go past the first stop position.

If the current speed of rotation of the main rotor goes above the required speed of rotation, then the anchoring of the control member is modified by the motor means so as to increase the current collective pitch of the blades of the rotorcraft. Consequently, the force felt by the pilot in the control member increases, and the pilot can advantageously move it in the decreasing force direction in order to correct the speed of rotation of the main rotor. The control member thus also moves upwards with the effect of increasing the load on the main rotor and of correcting its speed of rotation by reducing it.

The same mechanism applies for an initial variation to reduce the speed of rotation of the main rotor. It should be observed that if the pilot finds it appropriate to perform the maneuver in some other way, the pilot is entirely free to do so by opposing the anchoring forces, which remain compatible with the control member being actuated manually.

Furthermore, once the control member has been moved by the pilot into a position lying beyond the first stop position, also referred to as a "soft-stop", the drive step serves to cause the speed of rotation of the main rotor to take on the speed of rotation required for a stage of flight in auto-rotation of the rotorcraft. Thus, once the first stop position has been exceeded, the pilot is certain that the desynchronization between the power plant and the main rotor will be stable so as to guarantee that the stage of flight in auto-rotation is as safe as possible.

In practice, the amplitude of positions of the control member may include a second stop position for the control member, the second stop position being generated by the motor means exerting a second predetermined force opposing the manual actuation force exerted by the pilot of the rotorcraft on the control member, such a second predetermined force acting locally on the amplitude of positions of the control member when the control member is arranged at the second stop position, the second predetermined force being greater than the manual actuation force exerted by the pilot on the control member.

Thus, the pilot of the rotorcraft cannot move the control member into a position lying beyond the second stop position. Such a second stop position may then be referred to as a rigid stop or a hard-stop. This second stop position may for example correspond to a position in which the control member generates a control setpoint for causing the collective pitch of the main rotor to take on a value in the range 0° to 2°, and preferably a value close to 1°. Under such circumstances, the auto-rotation position of the control member may correspond to a position in which the control member generates a control setpoint for causing the collective pitch of the main rotor to have a value lying in the range 1° to 3°, and preferably a value close to 2°.

Under such circumstances, the motor means serve both to generate the first and second stop positions by exerting the first and second predetermined forces as a function of the position of the control member, and also to anchor the control member in the auto-rotation position once the pilot has actuated the control member to go past the second stop position. Naturally, once the control member is anchored in its auto-rotation position, the pilot of the rotorcraft can modify the position of the control member about the anchor position, and can, for example, move the position of the control member towards the second or rigid stop position.

Under such circumstances, and in preferred manner, the second stop position of the control member may coincide with a limit position of the control member in which the control member generates a control setpoint for servo-controlling a current collective pitch of the blades of the main rotor on a minimum pitch for the blades of the main rotor generating a maximum speed of rotation of the main rotor during the stage of flight in auto-rotation of the rotorcraft.

Thus, the drive step also makes it possible in real time to establish a minimum pitch corresponding to the limit speed of rotation of the main rotor before there is any risk of damage. Depending on current environmental conditions, such a minimum pitch need not necessarily be the "full fine pitch" corresponding to a collective pitch angle of zero.

At the second stop position of the control member, the drive step serves to generate the second predetermined force locally over the amplitude of positions of the control member. Such a drive step of the control member then serves to prevent the current collective pitch angle of the blades being reduced, since that would lead to exceeding the limit speed of rotation for the main rotor.

In practice, the control member may include a step of generating sense signals for informing the pilot of the rotorcraft, the sense signals being representative of the current collective pitch of the blades of the main rotor and of the "auto-rotation collective pitch" calculated during the calculation step.

Such a step of generating sense signals then enables the pilot to be provided not only with tactile information that can be sensed in the control member, but also with sense information that may for example be visual, such as a light signal or an image on a screen, a sound signal, or indeed a vibratory signal. The pilot can then be informed about the current power level of the power plant relative to the "auto-rotation collective pitch" as calculated during the calculation step.

In addition, such sense signals may be representative of the minimum pitch of the blades of the main rotor generating a maximum speed of rotation of the main rotor during the stage of flight in auto-rotation of the rotorcraft.

The pilot can thus be informed about the current power level of the power plant relative to the limits due to its maximum speed of rotation.

Advantageously, the motor means may enable a stick of the control member to be moved relative to a support secured to a structure of the rotorcraft and to exert a position return force on the stick of the control member when a current position of the control member is different from the "auto-rotation position".

Thus, the motor means also serve to exert return force on the stick of the control member by generating a force opposing its movement and by generating a zero force position corresponding to the "auto-rotation position" of the control member.

The present invention also provides a control system for controlling a main rotor of a rotorcraft to perform a stage of flight in auto-rotation of the rotorcraft, such a control system comprising:

a control member for controlling the collective pitch of the blades of the main rotor, the control member being movable over an amplitude of positions lying between two extreme physical stops;

a calculation unit for calculating a collective pitch angle for the blades of the main rotor referred to as an "auto-rotation collective pitch", such an "auto-rotation collective pitch" enabling the main rotor to rotate at a speed of rotation that is optimum for the stage of flight in auto-rotation of the rotorcraft; and motor means for generating over the amplitude of positions of the control member a first stop position for the control member, such a first stop position being generated by exerting a first predetermined force opposing a manual actuation force exerted by a pilot of the rotorcraft on the control member, the first predetermined force acting locally over the amplitude of positions of the control member when the control member is arranged at the first stop position, the manual actuation force exerted by the pilot on the control member being capable of exceeding the first predetermined force.

According to the invention, the control system is remarkable in that the motor means servo-control the position of said control member on predetermined position referred to as the "auto-rotation position" in which said control member generates a control setpoint for servo-controlling the current collective pitch of the blades of the main rotor on the "auto-rotation collective pitch", and in that the first stop position of the control member coincides with a "desynchronization position" in which the control member generates a control setpoint for servo-controlling a current collective pitch of the blades of the main rotor on a "desynchronization collective pitch" for desynchronizing rotary motion between the main rotor and a power plant of the rotorcraft.

In practice, the calculation unit of the control system may be formed by an on-board computer or indeed by a computer or a microprocessor suitable for performing a large number of calculations quickly and automatically in order to determine the "auto-rotation collective pitch" at each instant.

The motor means serve to anchor the control member and servo-control its current position on the predetermined position, referred to as the "auto-rotation position". Such motor means also serve to generate the movement and force control laws that apply to the control member, and in particular to determine the first predetermined force acting on the control member at the first stop position.

Furthermore, once the soft-stop on the amplitude of positions for the control member has been passed, the pilot of the rotorcraft knows that the control member is accurately positioned in the so-called "auto-rotation position". The control member thus remains anchored in its current position and no sudden movement is transmitted to the control member, thus avoiding surprising the pilot of the rotorcraft.

In an advantageous embodiment, the motor means may generate over the amplitude of positions for the control member a second stop position of the control member, such a second stop position being generated by exerting a second predetermined force opposing the manual actuation force exerted by the pilot of the rotorcraft on the control member, the second predetermined force acting locally on the amplitude of positions of the control member when the control member is arranged at the second stop position, the second predetermined force being greater than the manual actuation force exerted by the pilot on the control member.

Thus, like the soft first stop position, the second stop position is generated by the motor means, but in contrast it cannot be exceeded. This second stop position is thus a priori different from the extreme physical stops over the amplitude of positions of the control member.

In practice, the second stop position of the control member may coincide with a limit position of the control member in which the control member generates a control setpoint for servo-controlling a current collective pitch of the blades of the main rotor on a minimum pitch for the blades of the main rotor generating a maximum speed of rotation of the main rotor during the stage of flight in auto-rotation of the rotorcraft.

In this way, the control system makes it possible to guarantee that there is no violation of structural limits of the power plant, such as in particular its maximum speed of rotation, which could lead to premature damage of the mechanical assemblies making it up.

In an advantageous embodiment, the control system may include information means generating sense signals for informing the pilot of the rotorcraft, the sense signals being representative of the current collective pitch of the blades of the main rotor and of the "auto-rotation collective pitch" calculated by the calculation unit.

As mentioned above, such information means can thus generate a light signal, a visual signal, a sound signal, or a vibratory signal serving to inform the pilot about the level of the current collective pitch of the blades of the main rotor and to compare that level with the "auto-rotation collective pitch" as calculated by the calculation unit.

Advantageously, such sense signals may be representative of the minimum pitch of the blades of the main rotor generating a maximum speed of rotation of the main rotor during the stage of flight in auto-rotation of the rotorcraft.

In this way, the pilot of the rotorcraft can also at all times compare the current collective pitch level of the blades of the main rotor with the minimum pitch that is acceptable for the power plant of the main rotor.

In practice, the motor means may move a stick of the control member relative to a support secured to a structure of the rotorcraft and exert a position return force on the stick of the control member when a current position of the control member is different from the "auto-rotation position".

In another aspect, the invention also relates to a particular rotorcraft. Such a rotorcraft is remarkable in that it includes a control system as described above for controlling a main rotor and for performing a stage of flight of the rotorcraft in auto-rotation.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

DETAILED DESCRIPTION OF THE INVENTION

As mentioned above, the invention relates to a control system for controlling a helicopter main rotor.

Figure 1:
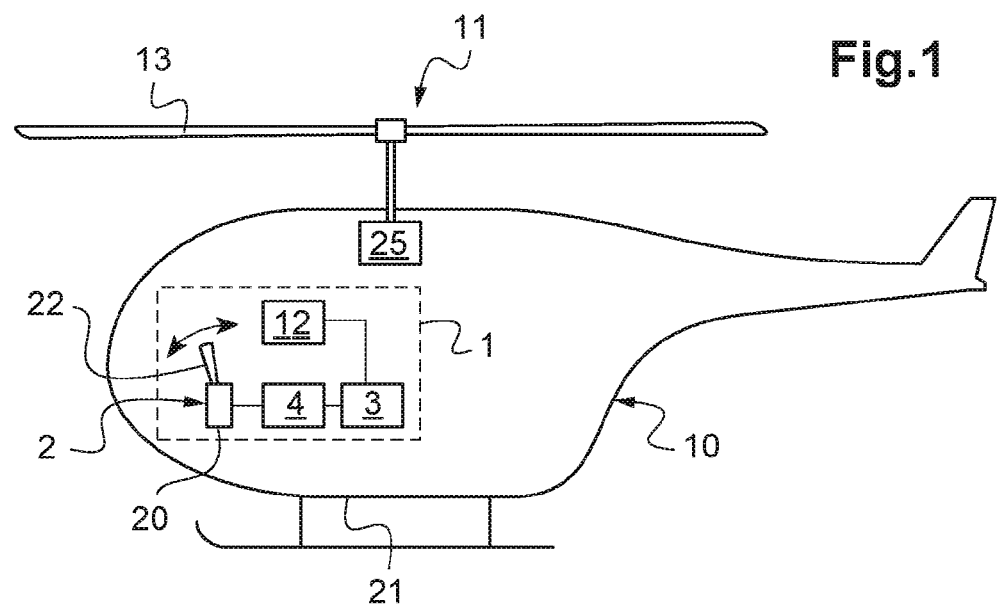
FIG. 1 is a diagrammatic side view of a rotorcraft in accordance with the invention.

As shown in FIG. 1, such a control system 1 comprises a control member 2 for modifying the collective pitch of the blades 13 of the main rotor 11, which rotor is driven in rotation by a power plant 25. In addition, and by way of example, such a control member 2 may consist in an electrical flight control such as a mini-stick, and it includes a stick 22 that can be moved relative to a support 20 secured to the structure 21 of the rotorcraft 10.

Figure 2:
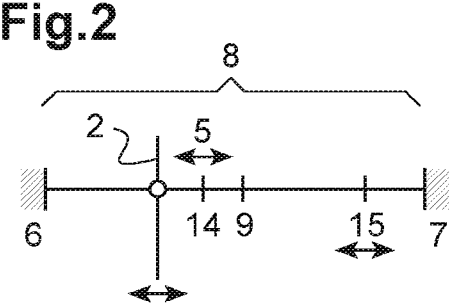
FIGS. 2 to 4 are diagrams showing different amplitudes of positions for a control member, in accordance with the invention.
Figure 3:
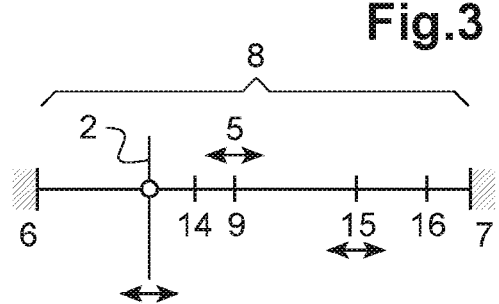
Figure 4:
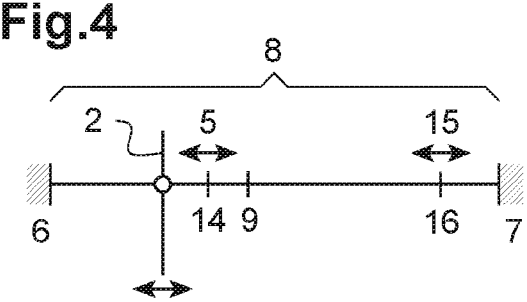

As shown in FIGS. 2 to 4, the control member 2 is movable over an amplitude 8 of distinct positions between two extreme physical stops 6 and 7.

Such a control system 1 also includes a calculation unit 3, such as a computer, for example, serving at every moment to calculate a collective pitch angle for the blades 13 of the main rotor 11, which angle is referred to as the "auto-rotation collective pitch". Such an "auto-rotation collective pitch" enables the main rotor 11 to rotate at an optimum speed for enabling the rotorcraft 10 to perform such a stage of flight in auto-rotation.

Finally, such a control system 1 includes motor means 4 serving firstly to servo-control the position of the control member 2 so as to put it into a predetermined position referred to as the "auto-rotation position" 9, and secondly to generate over the amplitude 8 of positions a first stop position 5 that can be manually exceeded by the pilot of the rotorcraft 10.

In a first variant of the invention, as shown in FIG. 2, such a first stop position 5 may advantageously coincide with a "desynchronization position" 14 in which the control member 2 generates a control setpoint for desynchronizing rotation of the rotor 11 relative to rotation of the power plant 25.

Under such circumstances, as soon as the pilot exerts a manual actuation force greater than the first predetermined force acting on the control member 2 at the first stop position 5, the motor means 4 then allow the control member 2 to be moved towards the "auto-rotation position" 9.

In a second variant of the invention as shown in FIG. 3, such a first stop position 5 may also coincide with the "auto-rotation position" 9. Under such circumstances, as soon as the pilot exerts a manual actuation force greater than the first predetermined force exerted on the control member 2 at the first stop position 5, the motor means 4 instantaneously enable the control member 2 to be servo-controlled on the "auto-rotation position" 9, which can thus be different from the "desynchronization position" 14.

In addition, as shown in FIG. 1, the control system 1 may also have information means 12 for informing the pilot of the rotorcraft 10 about the amount of margin that is available for piloting over the amplitude 8 of positions of the control member 2. Advantageously, such information means 12 comprise a screen for delivering visible sense signals such as images or lights, e.g. indicating the level of the collective pitch angle of the blades 13 of the main rotor 11 relative to the "auto-rotation collective pitch" and/or relative to a minimum pitch that is acceptable for the power plant 25 of the main rotor 11.

Furthermore, and as shown in FIGS. 3 and 4, such a minimum pitch that is acceptable for the power plant 25 may be obtained in a limit position 16 of the control member 2 over the amplitude 8 of positions for the control member 2.

In addition, as shown in FIGS. 2 to 4, the amplitude 8 of positions for the control member 2 may also include a second stop position 15 that cannot be exceeded manually by a pilot of the rotorcraft. Such a second stop position 15 is thus generated by exerting a second predetermined force on the control member 2 opposing a manual actuation force exerted by the pilot of the rotorcraft 10 on the control member 2.

As shown in FIG. 4, the limit position 16 may coincide with this second stop position 15 arranged on the amplitude 8 of positions for the control member 2. In this way, the pilot of the rotorcraft 10 is protected against potentially exceeding the maximum speed of rotation that is acceptable for the power plant 25, in particular in the event of auto-rotation being engaged deliberately by a pilot for training purposes. Such a power plant 25 then continues to conserve a speed of rotation that is compatible with its structural limit.

Figure 5:
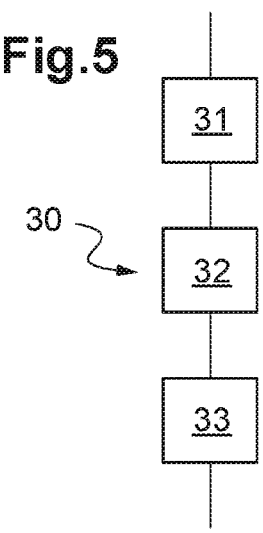
FIG. 5 is a flow chart showing certain steps of the control method in accordance with the invention.

As shown in FIG. 5, the invention thus also relates to a method 30 of controlling a main rotor 11 of a rotorcraft 10 in order to perform a stage of flight in auto-rotation. Such a control method may comprise in particular:

a calculation step 31 for calculating at every moment an "auto-rotation collective pitch" for the blades 13 of the main rotor 11 that would generate an optimum speed of rotation of the main rotor 11 for such a stage of flight in auto-rotation;

a drive step 32 of applying motor drive to the control member 2 for controlling the collective pitch of the blades 13 of the main rotor 11, such a drive step 32 serving to servo-control the position of the control member 2 on an "auto-rotation position" 9 in which it generates a control setpoint for servo-controlling the current collective pitch of the blades 13 of the main rotor 11 on the "auto-rotation collective pitch"; and a generation step of generating sense signals 33 for informing the pilot of the rotorcraft 10 about the current collective pitch value of the blades 13 of the main rotor 11, and for example about the "auto-rotation collective pitch" calculated during the calculation step 31.

The drive step 32 is performed when a pilot of the rotorcraft 10 voluntarily and manually moves the control member 2 over the amplitude 8 of positions for the control member 2 so as to position it beyond the first stop position 5 going towards the extreme physical stop 7.

This first stop position 5 is also generated by exerting a first predetermined force opposing a manual actuation force exerted by said pilot on said control member 2. The first predetermined force then acts locally on the amplitude 8 of positions for the control member 2 arranged at the first stop position 5.

Finally, and as mentioned above, the first predetermined force can be exceeded by the manual actuation force exerted by the pilot on the control member 2 such that it is the action of moving the control member 2 beyond the first stop position 5 that enables the pilot to actuate the drive step 32 of applying motor drive to the control member 2.

As mentioned above, the motor means 4 serve both to generate the first and second stop positions 5 and 15 by exerting the first and second predetermined forces as a function of the position of the control member 2 and also to anchor the control member 2 in the "auto-rotation position" 9 once the pilot has actuated the control member 2 towards the extreme physical stop 7 in order to go past the first stop position 5 by exceeding the first predetermined force.

Once the control member 2 has been positioned by the pilot in a zone of its amplitude 8 of positions beyond the first stop position 5, the control member 2 can then be moved automatically to the "auto-rotation position" 9 and then anchored in this "auto-rotation position" 9.

Nevertheless, the pilot of the rotorcraft 10 can always modify the position of the control member 2 about the "auto-rotation position" 9, and for example can cause the position of the control member 2 to move towards the second stop position 15, which cannot be exceeded.

Naturally, the present invention may be subjected to numerous variations as to its implementation. Although several implementations are described, it can readily be understood that it is not conceivable to identify exhaustively all possible implementations. It is naturally possible to envisage replacing any of the means described by equivalent means without going beyond the ambit of the present invention.

What is claimed is:

1. A control method for controlling a main rotor of a rotorcraft to perform a stage of flight in auto-rotation of the rotorcraft, the control method comprising:

a calculation step for calculating a collective pitch angle for the blades of the main rotor, referred to as the "auto-rotation collective pitch", the "auto-rotation collective pitch" generating a speed of rotation of the main rotor that is optimized for the stage of flight in auto-rotation of the rotorcraft; and a drive step of applying motor drive to a control member for controlling the collective pitch of the blades of the main rotor, the control member being movable over an amplitude of positions lying between two extreme physical stops, the drive step being performed by motor means and being used when a pilot of the rotorcraft manually moves the control member over the amplitude of positions of the control member and positions the control member beyond a first stop position of the control member, the first stop position being generated by the motor means exerting a first predetermined force opposing a manual actuation force exerted by the pilot on the control member, the first predetermined force acting locally over the amplitude of positions of the control member when the control member is arranged at the first stop position, the manual actuation force exerted by the pilot on the control member being capable of exceeding the first predetermined force;

wherein the motor means enable the position of the control member to be servo-controlled on a predetermined position referred to as the "auto-rotation position" in which the control member generates a control setpoint for servo-controlling the current collective pitch of the blades of the main rotor on the "auto-rotation collective pitch", and wherein the first stop position of the control member coincides with a "desynchronization position" in which the control member generates a control setpoint for servo-controlling a current collective pitch of the blades of the main rotor on a "desynchronization collective pitch" for desynchronizing rotary motion between the main rotor and a power plant of the rotorcraft.

2. A method according to claim 1, wherein the amplitude of positions of the control member includes a second stop position for the control member, the second stop position being generated by the motor means exerting a second predetermined force opposing the manual actuation force exerted by the pilot of the rotorcraft on the control member, the second predetermined force acting locally on the amplitude of positions of the control member when the control member is arranged at the second stop position, the second predetermined force being greater than the manual actuation force exerted by the pilot on the control member.

3. A method according to claim 2, wherein the second stop position of the control member coincides with a limit position of the control member in which the control member generates a control setpoint for servo-controlling a current collective pitch of the blades of the main rotor on a minimum pitch for the blades of the main rotor generating a maximum speed of rotation of the main rotor during the stage of flight in auto-rotation of the rotorcraft.

4. A method according to claim 1, wherein the control method includes a step of generating sense signals for informing the pilot of the rotorcraft, the sense signals being representative of the current collective pitch of the blades of the main rotor and of the "auto-rotation collective pitch" calculated during the calculation step.

5. A method according to claim 4, wherein the sense signals are representative of the minimum pitch of the blades of the main rotor generating a maximum speed of rotation of the main rotor during the stage of flight in auto-rotation of the rotorcraft.

6. A method according to claim 1, wherein the motor means enable a stick of the control member to be moved relative to a support secured to a structure of the rotorcraft and to exert a position return force on the stick of the control member when a current position of the control member is different from the "auto-rotation position".

7. A control system for controlling a main rotor of a rotorcraft to perform a stage of flight in auto-rotation of the rotorcraft, the control system comprising:

a control member for controlling the collective pitch of the blades of the main rotor, the control member being movable over an amplitude of positions lying between two extreme physical stops;

a calculation unit for calculating a collective pitch angle for the blades of the main rotor referred to as an "auto-rotation collective pitch", the "auto-rotation collective pitch" enabling the main rotor to rotate at a speed of rotation that is optimum for the stage of flight in auto-rotation of the rotorcraft; and motor means for generating over the amplitude of positions of the control member a first stop position for the control member, the first stop position being generated by exerting a first predetermined force opposing a manual actuation force exerted by a pilot of the rotorcraft on the control member, the first predetermined force acting locally over the amplitude of positions of the control member when the control member is arranged at the first stop position, the manual actuation force exerted by the pilot on the control member being capable of exceeding the first predetermined force;

wherein the motor means servo-control the position of the control member on a predetermined position referred to as the "auto-rotation position" in which the control member generates a control setpoint for servo-controlling the current collective pitch of the blades of the main rotor on the "auto-rotation collective pitch", and wherein the first stop position of the control member coincides with a "desynchronization position" in which the control member generates a control setpoint for servo-controlling a current collective pitch of the blades of the main rotor on a "desynchronization collective pitch" for desynchronizing rotary motion between the main rotor and a power plant of the rotorcraft.

8. A control system according to claim 7, wherein the motor means generate over the amplitude of positions of the control member a second stop position for the control member, the second stop position being generated by exerting a second predetermined force opposing the manual actuation force exerted by the pilot of the rotorcraft on the control member, the second predetermined force acting locally on the amplitude of positions of the control member when the control member is arranged at the second stop position, the second predetermined force being greater than the manual actuation force exerted by the pilot on the control member.

9. A control system according to claim 8, wherein the second stop position of the control member coincides with a limit position of the control member in which the control member generates a control setpoint for servo-controlling a current collective pitch of the blades of the main rotor on a minimum pitch for the blades of the main rotor generating a maximum speed of rotation of the main rotor during the stage of flight in auto-rotation of the rotorcraft.

10. A control system according to claim 7, wherein the control system includes information means generating sense signals for informing the pilot of the rotorcraft, the sense signals being representative of the current collective pitch of the blades of the main rotor and of the "auto-rotation collective pitch" calculated by the calculation unit.

11. A control system according to claim 10, wherein the sense signals are representative of the minimum pitch of the blades of the main rotor generating a maximum speed of rotation of the main rotor during the stage of flight in auto-rotation of the rotorcraft.

12. A control system according to claim 7, wherein the motor means move a stick of the control member relative to a support secured to a structure of the rotorcraft and exert a position return force on the stick of the control member when a current position of the control member is different from the "auto-rotation position".

13. A rotorcraft having a main rotor for providing the rotorcraft at least with lift, wherein the rotorcraft includes a control system according to claim 7 for controlling the main rotor and for performing a stage of flight in auto-rotation of the rotorcraft.

\* \* \* \* \*